United States Patent
Sahin et al.

(10) Patent No.: US 11,765,012 B2
(45) Date of Patent: Sep. 19, 2023

(54) METHODS FOR FLEXIBLE REFERENCE SIGNAL TRANSMISSION WITH SINGLE CARRIER FREQUENCY DOMAIN MULTIPLE ACCESS (SC-FDMA) AND OFDMA

(71) Applicant: INTERDIGITAL PATENT HOLDINGS, INC., Wilmington, DE (US)

(72) Inventors: Alphan Sahin, Westbury, NY (US); Rui Yang, Greenlawn, NY (US); Erdem Bala, East Meadow, NY (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

(21) Appl. No.: 17/226,944

(22) Filed: Apr. 9, 2021

(65) Prior Publication Data

US 2021/0226836 A1 Jul. 22, 2021

Related U.S. Application Data

(63) Continuation of application No. 16/324,408, filed as application No. PCT/US2017/046195 on Aug. 10, 2017, now abandoned.

(Continued)

(51) Int. Cl.
*H04L 27/26* (2006.01)
*H04L 1/00* (2006.01)
(Continued)

(52) U.S. Cl.
CPC ........ *H04L 27/2636* (2013.01); *H04L 1/0069* (2013.01); *H04L 1/0071* (2013.01);
(Continued)

(58) Field of Classification Search
None
See application file for complete search history.

(56) References Cited

U.S. PATENT DOCUMENTS 8,503,425 B2 8/2013 Chung et al.
8,644,199 B2 2/2014 Papasakellariou et al.
(Continued)

OTHER PUBLICATIONS

Huawei et al., "Discussion on more orthogonal DMRS ports with partial overlapping," 3GPP TSG RAN WG1 Meeting #85, R1-164099, Nanjing, China (May 23-27, 2016).

(Continued)

*Primary Examiner* — Sai Aung
(74) *Attorney, Agent, or Firm* — VOLPE KOENIG

(57) ABSTRACT

A method for transmitting a discrete fourier transform (DFT) DFT-S-OFDM signal including frequency domain reference symbols is disclosed. The method comprises: determining to null a plurality of data symbols prior to DFT-spreading; performing DFT-spreading including the determined null data symbols; puncturing an interleaved output of the DFT-spreading; inserting reference symbols in a frequency domain of the punctured and interleaved DFT-S-OFDM signal; and transmitting the DFT-S-OFDM signal with inserted reference symbols to a receiver. The transmitted DFT-S-OFDM signal enables the receiver to apply zeros corresponding to the reference symbols to an interleaved input of DFT-despreading, and cancel interference due to the puncturing by using all outputs of the DFT-despreading.

11 Claims, 11 Drawing Sheets

Related U.S. Application Data

(60) Provisional application No. 62/373,126, filed on Aug. 10, 2016, provisional application No. 62/479,792, filed on Mar. 31, 2017.

(51) Int. Cl.
*H04B 17/309* (2015.01)
*H04W 4/70* (2018.01)
*H04L 5/00* (2006.01)

(52) U.S. Cl.
CPC ............ *H04L 5/0051* (2013.01); *H04W 4/70* (2018.02); *H04L 5/0007* (2013.01)

(56) References Cited

U.S. PATENT DOCUMENTS

| | | | |
|---|---|---|---|
| 8,824,267 B2 | 9/2014 | Cheng et al. | |
| 8,843,142 B2 | 9/2014 | Nishio et al. | |
| 8,885,591 B2 | 11/2014 | Han et al. | |
| 8,917,788 B2* | 12/2014 | Yokomakura | H04W 52/0229 375/267 |
| 8,995,540 B2 | 3/2015 | To et al. | |
| 9,119,187 B2 | 8/2015 | Nakamura et al. | |
| 9,313,775 B2 | 4/2016 | Takahashi et al. | |
| 2007/0280365 A1 | 12/2007 | Seki | |
| 2011/0182332 A1 | 7/2011 | Ericson et al. | |
| 2011/0274043 A1* | 11/2011 | Nam | H04W 72/1289 370/328 |
| 2012/0087393 A1 | 4/2012 | Jeong et al. | |
| 2012/0120942 A1 | 5/2012 | Hamaguchi et al. | |
| 2012/0327884 A1 | 12/2012 | Seo et al. | |
| 2013/0242930 A1* | 9/2013 | Takahashi | H04L 27/2623 370/329 |
| 2013/0265973 A1 | 10/2013 | Nakamura et al. | |
| 2013/0301550 A1* | 11/2013 | Kim | H04L 1/0073 370/329 |
| 2013/0336276 A1 | 12/2013 | Takahashi et al. | |
| 2014/0269520 A1 | 9/2014 | Yi et al. | |
| 2015/0111505 A1* | 4/2015 | Kim | H04J 11/0053 455/67.13 |
| 2016/0254889 A1* | 9/2016 | Shattil | H04B 7/0452 370/329 |
| 2017/0041103 A1* | 2/2017 | Määttanen | H04L 5/005 |
| 2018/0205525 A1* | 7/2018 | He | H04L 1/1864 |
| 2021/0076371 A1* | 3/2021 | Bhamri | H04W 88/06 |

OTHER PUBLICATIONS

Berardinelli et al., "On the Potential of OFDM Enhancements as 5G Waveforms,", Proceedings of the IEEE Vehicular Technology Conference (VTC Spring), pp. 1-5 (2014).
Huawei et al., "Channel coding for URLLC," 3GPP TSG RAN WG1 Meeting #89 Meeting, R1-1707007, Hangzhou, China (May 15-19, 2017).
Intel Corporation, "Uplink DM-RS design for NR," 3GPP TSG RAN WG1 NR Ad-Hoc meeting, R1-1700353, Spokane, USA (Jan. 16-20, 2017).
Interdigital Communications, "A common framework for RS design in UL NR," 3GPP TSG RAN WG1 Meeting #87, R1-1612640, Reno, USA (Nov. 14-18, 2016).
Interdigital Communications, "Coexistence of CP OFDM and CP DFT-s-OFDM for NR UL," 3GPP TSG RAN WG1 Meeting #86bis, R1-1609887, Lisbon, Portugal (Oct. 10-14, 2016).
Kumar et al., "A Waveform for 5G: Guard Interval DFT-s-OFDM," 2015 IEEE Globecom Workshops (GC Workshops) (Feb. 25, 2016).
Lahetkangas et al., "On the Flexible 5G Dense Deployment Air Interface for Mobile Broadband," 1st International Conference on 5G for Ubiquitous Connectivity (Nov. 26-28, 2014).
Sahin et al., "An Improved Unique Word DFT-Spread OFDM Scheme for 5G Systems," IEEE Globecom Workshops (Dec. 2015).
Zhang et al., "Filtered-OFDM—Enabler for Flexible Waveform in the 5th Generation Cellular Networks," IEEE Global Communications Conference (GLOBECOM) (Dec. 6-10, 2015).
Fiberhome, "General views on DM-RS enhancements in uplink for FD-MIMO," 3GPP TSG RAN WG1 Meeting #85, R1-164348, Nanjing, China (May 23-27, 2016).
KT Corp. et al., "Discussion on NR numerology," 3GPP TSG RAN WG1 Meeting #85, R1-165525, Nanjing, China (May 23-27, 2016).
Third Generation Partnership Project, "Technical Specification Group Radio Access Network; Evolved Universal Terrestrial Radio Access (E-UTRA); Physical channels and modulation (Release 13)," 3GPP TS 36.211 V13.2.0 (Jun. 2016).
Third Generation Partnership Project, "Technical Specification Group Radio Access Network; Evolved Universal Terrestrial Radio Access (E-UTRA); Physical channels and modulation (Release 13)," 3GPP TS 36.211 V13.6.0 (Jun. 2017).
Third Generation Partnership Project, "Technical Specification Group Radio Access Network; Evolved Universal Terrestrial Radio Access (E-UTRA); Physical channels and modulation (Release 14)," 3GPP TS 36.211 V14.3.0 (Jun. 2017).
Third Generation Partnership Project, "Technical Specification Group Radio Access Network; Evolved Universal Terrestrial Radio Access (E-UTRA); Multiplexing and channel coding (Release 13)," 3GPP TS 36.212 V13.2.0 (Jun. 2016).
Third Generation Partnership Project, "Technical Specification Group Radio Access Network; Evolved Universal Terrestrial Radio Access (E-UTRA); Multiplexing and channel coding (Release 13)," 3GPP TS 36.212 V13.6.0 (Jun. 2017).
Third Generation Partnership Project, "Technical Specification Group Radio Access Network; Evolved Universal Terrestrial Radio Access (E-UTRA); Multiplexing and channel coding (Release 14)," 3GPP TS 36.212 V14.3.0 (Jun. 2017).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.3.0 (Mar. 2016).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.8.0 (Jun. 2017).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.3.0 (Jun. 2017).
Third Generation Partnership Project, "Technical Specification Group Radio Access Network; NR; Multiplexing and channel coding (Release 15)," 3GPP TS 38.212 V0.0.0 (May 2017).
Third Generation Partnership Project, "Technical Specification Group Radio Access Network; NR; Physical channels and modulation (Release 15)," 3GPP TS 38.211 V0.1.0 (Jun. 2017).
Third Generation Partnership Project, "Technical Specification Group Radio Access Network; NR; NR and NG-RAN Overall Description; Stage 2 (Release 15)," 3GPP TS 38.300 V0.6.0 (Aug. 2017).
Dhakal et al., "Adaptive Pilot Placement for Estimation of Vehicle to Vehicle Wireless Channel," 2013 International Conference on Connected Vehicles and Expo, pp. 216-220 (Dec. 2013).
Nevat et al., "OFDM CIR Estimation with Unknown Length via Bayesian Model Selection and Averaging," Vehicular Technology Conference, pp. 1413-1417 (May 2008).
Toshiba, "Downlink Pilot Structure for Evolved UTRA," TSG-RAN WG1 #42, R1-050878, London, UK (Aug. 29-Sep. 2, 2005).

* cited by examiner

METHODS FOR FLEXIBLE REFERENCE SIGNAL TRANSMISSION WITH SINGLE CARRIER FREQUENCY DOMAIN MULTIPLE ACCESS (SC-FDMA) AND OFDMA

CROSS REFERENCE TO RELATED APPLICATIONS

This application is a continuation of U.S. patent application Ser. No. 16/324,408 filed Feb. 8, 2019, which is the U.S. National Stage, under 35 U.S.C. § 371, of International Application No. PCT/US2017/046195 filed Aug. 10, 2017, which claims the benefit of U.S. provisional application No. 62/373,126 filed on Aug. 10, 2016 and U.S. provisional application No. 62/479,792 filed on Mar. 31, 2017 the contents of which are hereby incorporated by reference herein.

BACKGROUND

In typical single-carrier frequency division multiple access (SC-FDMA) communications, such as is used in Long Term Evolution (LTE) uplink transmission, the reference signal (RS) for data transmission can only be allocated in two time-domain symbol locations and no data symbols can be transmitted in those locations. This overhead in terms of resource usage is fixed for all users, regardless how different the channel conditions are among them, and cannot be changed dynamically based on channel conditions and the need of services. For example, in low SINR and ultra-reliable application scenario, adding more RS will allow the receiver to estimate the channel more accurately so the data can be detected with a low error rate. On the other hand, in high SINR and high data rate requirement scenario, some of the resources, which otherwise would be used for transmitting RS, can be used to transmit the data. Therefore, it is desirable to design a transmitter and receiver scheme that allows flexibly in inserting the reference signal depending on each users link condition.

SUMMARY

A method for transmitting a Discrete Fourier Transform-Spread-Orthogonal Frequency Division Multiple Access (DFT-S-OFDM) signal including frequency domain reference symbols is disclosed. The method comprises: determining to null a plurality of data symbols prior to DFT-spreading; performing DFT-spreading including the determined null data symbols; puncturing an interleaved output of the DFT-spreading; inserting reference symbols in a frequency domain of the punctured and interleaved DFT-S-OFDM signal; and transmitting the DFT-S-OFDM signal with inserted reference symbols to a receiver. The transmitted DFT-S-OFDM signal enables the receiver to apply zeros corresponding to the reference symbols to an interleaved input of DFT-despreading, and cancel interference due to the puncturing by using all outputs of the DFT-despreading.

The number of reference symbols inserted may be based on a channel condition associated with the receiver. For example if the channel condition is relatively poor, the number of reference symbols inserted may be increased.

BRIEF DESCRIPTION OF THE DRAWINGS

A more detailed understanding may be had from the following description, given by way of example in conjunction with the accompanying drawings wherein.

DETAILED DESCRIPTION

Figure 1A:
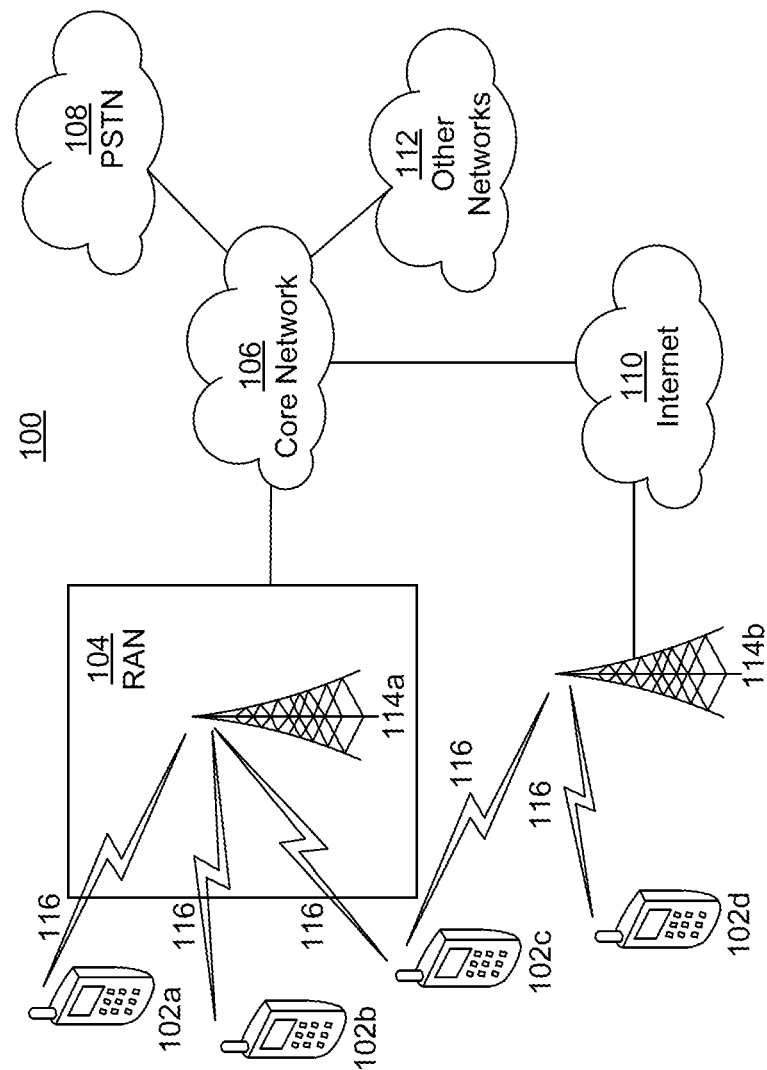
FIG. 1A is a system diagram of an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/, a CN 106/, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (loT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/ and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104/ may be in communication with the CN 106/, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/ may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/ and/or the CN 106/ may be in direct or indirect communication with other RANs that employ the same RAT as the RAN 104/ or a different RAT. For example, in addition to being connected to the RAN 104/, which may be utilizing a NR radio technology, the CN 106/ may also be in communication with another RAN (not shown) employing a GSM, UMTS, CDMA 2000, WiMAX, E-UTRA, or WiFi radio technology.

The CN 106/ may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/ or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
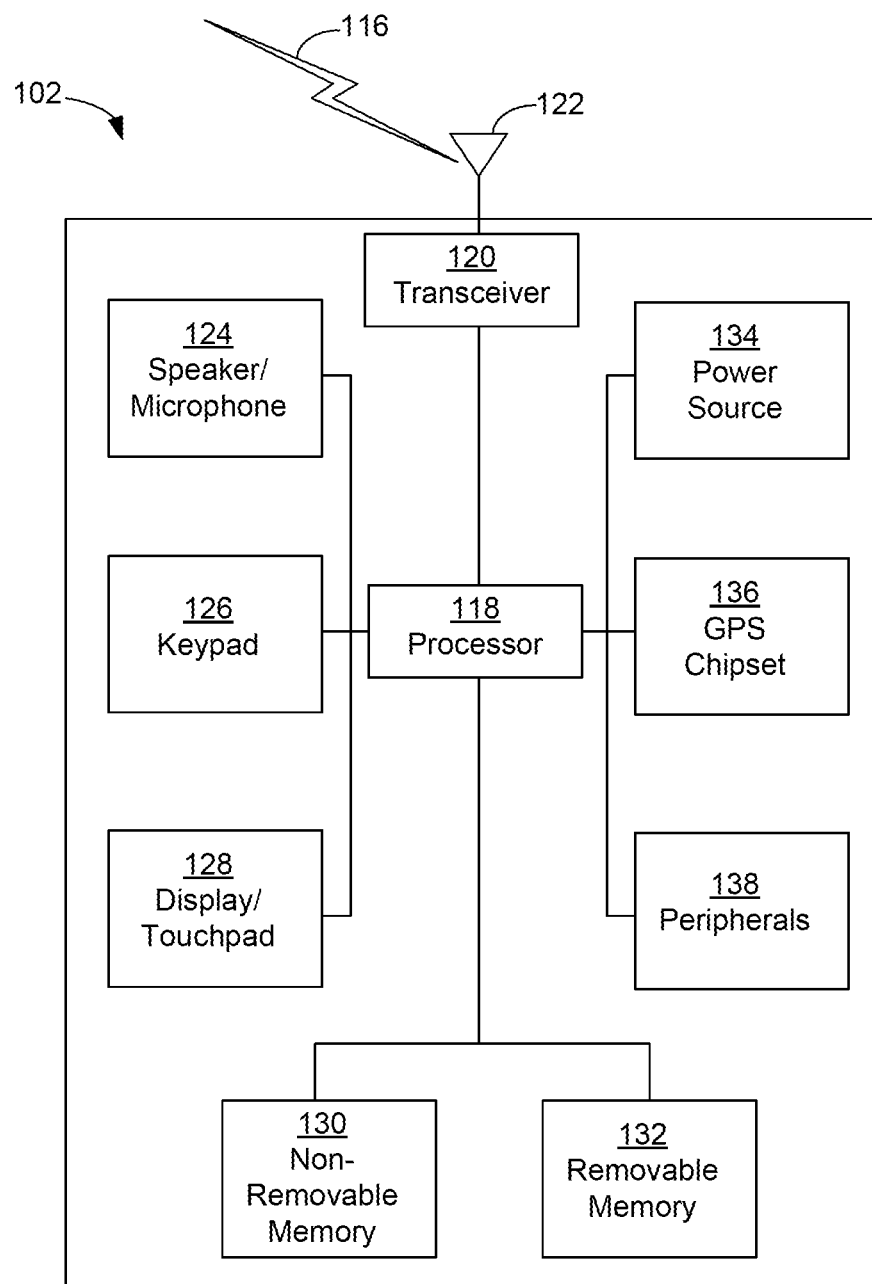
FIG. 1B is a system diagram of an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
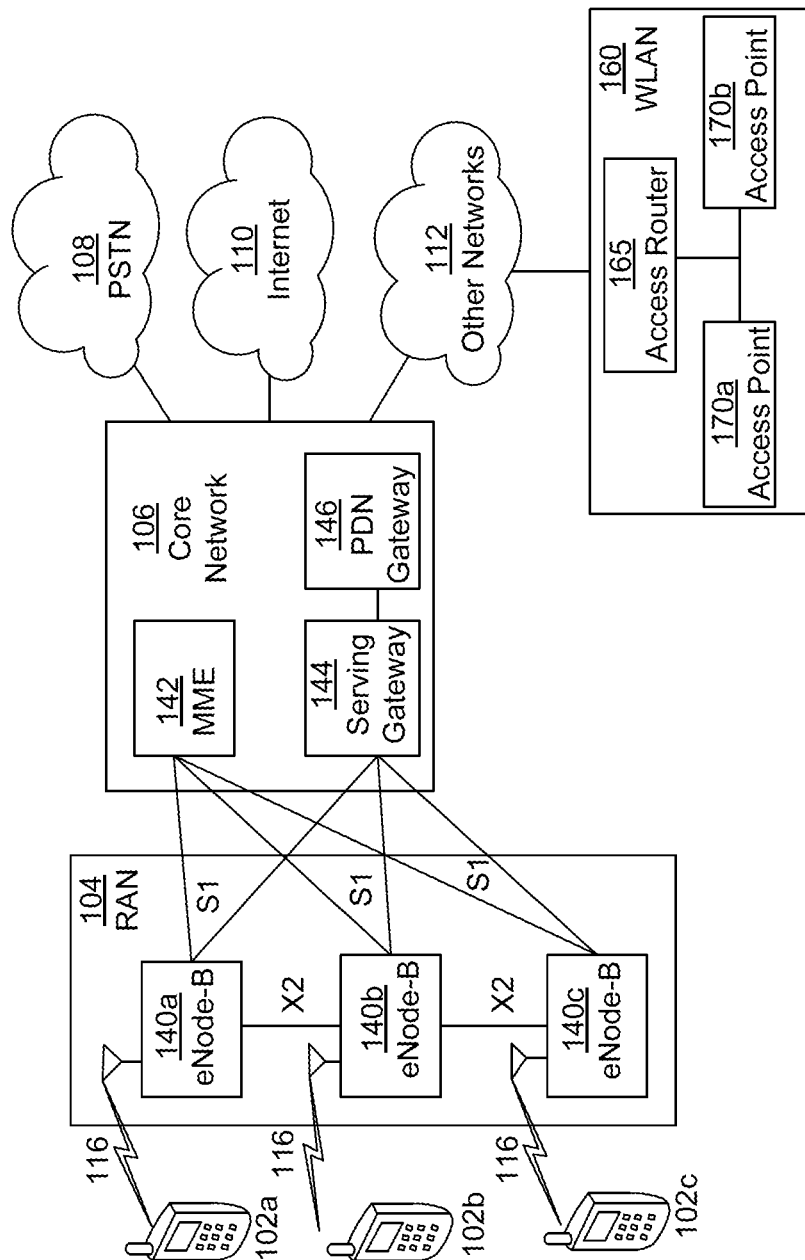
FIG. 1C is a system diagram of an example radio access network and an example core network that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and/or receive wireless signals from, the WTRU 102a.

Each of the eNode-Bs 140a, 140b, 140c may be associated with a particular cell (not shown) and may be configured to handle radio resource management decisions, handover decisions, scheduling of users in the UL and/or DL, and the like. As shown in FIG. 1C, the eNode-Bs 140a, 140b, 140c may communicate with one another over an X2 interface.

The CN 106 shown in FIG. 1C may include a mobility management entity (MME) 142, a serving gateway (SGW) 144, and a packet data network (PDN) gateway (or PGW) 146. While each of the foregoing elements are depicted as part of the CN 106, it will be appreciated that any of these elements may be owned and/or operated by an entity other than the CN operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may provide a control plane function for switching between the RAN 104 and other RANs (not shown) that employ other radio technologies, such as GSM and/or WCDMA.

The SGW 144 may be connected to each of the eNode Bs 140a, 140b, 140c in the RAN 104 via the S1 interface. The SGW 144 may generally route and forward user data packets to/from the WTRUs 102a, 102b, 102c. The SGW 144 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 144 may be connected to the PGW 146, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1C as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Another example of a communications system including the RAN 104 and the CN 106 is described herein. As noted above, the RAN 104 may employ an NR radio technology to communicate with the WTRUs 102a, 102b, 102c over the air interface 116. The RAN 104 may also be in communication with the CN 106.

The RAN 104 may include gNBs (not shown), though it will be appreciated that the RAN may include any number of gNBs while remaining consistent with an embodiment. The gNBs may each include one or more transceivers for communicating with the WTRUs 102a, 102b, 102c over the air interface 116. In one embodiment, the gNBs may implement MIMO technology. For example, the gNBs may utilize beamforming to transmit signals to and/or receive signals from the gNBs. Thus, a gNB, for example, may use multiple antennas to transmit wireless signals to, and/or receive wireless signals from, the WTRU 102a. In an embodiment, the gNBs may implement carrier aggregation technology. For example, a gNB may transmit multiple component carriers to the WTRU 102a. A subset of these component carriers may be on unlicensed spectrum while the remaining component carriers may be on licensed spectrum. In an embodiment, the gNBs may implement Coordinated Multi-Point (CoMP) technology. For example, WTRU 102a may receive coordinated transmissions from multiple gNBs.

The WTRUs 102a, 102b, 102c may communicate with the gNBs using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with the gNBs using subframe or transmission time intervals (TTIs) of various or scalable lengths (e.g., containing varying number of OFDM symbols and/or lasting varying lengths of absolute time).

The gNBs may be configured to communicate with the WTRUs 102a, 102b, 102c in a standalone configuration and/or a non-standalone configuration. In the standalone configuration, WTRUs 102a, 102b, 102c may communicate with the gNBs without also accessing other RANs (e.g., such as eNode-Bs 140a, 140b, 140c). In the standalone configuration, WTRUs 102a, 102b, 102c may utilize one or more of the gNBs as a mobility anchor point. In the standalone configuration, WTRUs 102a, 102b, 102c may communicate with the gNBs using signals in an unlicensed band. In a non-standalone configuration WTRUs 102a, 102b, 102c may communicate with/connect to the gNBs while also communicating with/connecting to another RAN such as eNode-Bs 140a, 140b, 140c. For example, WTRUs 102a, 102b, 102c may implement DC principles to communicate with one or more gNBs and one or more eNode-Bs 140a, 140b, 140c substantially simultaneously. In the non-standalone configuration, eNode-Bs 140a, 140b, 140c may serve as a mobility anchor for WTRUs 102a, 102b, 102c and the gNBs may provide additional coverage and/or throughput for servicing WTRUs 102a, 102b, 102c.

Each of the gNBs may be associated with a particular cell and may be configured to handle radio resource management decisions, handover decisions, scheduling of users in the UL and/or DL, support of network slicing, dual connectivity, interworking between NR and E-UTRA, routing of user plane data towards User Plane Function (UPF), routing of control plane information towards Access and Mobility Management Function (AMF) and the like. As described herein, the gNBs may communicate with one another over an Xn interface.

The CN 106 may include at least one AMF, at least one UPF, at least one Session Management Function (SMF), and possibly a Data Network (DN). While each of the foregoing elements are may be part of the CN 106, it will be appreciated that any of these elements may be owned and/or operated by an entity other than the CN operator.

The AMF may be connected to one or more of the gNBs in the RAN 104 via an N2 interface and may serve as a control node. For example, the AMF may be responsible for authenticating users of the WTRUs 102a, 102b, 102c, support for network slicing (e.g., handling of different PDU sessions with different requirements), selecting a particular SMF, management of the registration area, termination of NAS signaling, mobility management, and the like. Network slicing may be used by the AMF in order to customize CN support for WTRUs 102a, 102b, 102c based on the types of services being utilized. For example, different network slices may be established for different use cases such as services relying on ultra-reliable low latency (URLLC) access, services relying on enhanced massive mobile broadband (eMBB) access, services for machine type communication (MTC) access, and/or the like. The AMF may provide a control plane function for switching between the RAN 104 and other RANs that employ other radio technologies, such as LTE, LTE-A, LTE-A Pro, and/or non-3GPP access technologies such as WiFi.

The SMF may be connected to an AMF in the CN via an N11 interface. The SMF may also be connected to a UPF in the CN 106 via an N4 interface. The SMF may select and control the UPF and configure the routing of traffic through the UPF. The SMF may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF may be connected to one or more of the gNBs in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF may perform other functions, such as routing and forwarding packets, enforcing user plane policies, supporting multi-homed PDU sessions, handling user plane QoS, buffering downlink packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) through the UPF via the N3 interface to the UPF and an N6 interface between the UPF and the DN.

As described herein and in view of FIGS. 1A-1C, and the corresponding description of FIGS. 1A-1C, one or more, or all, of the functions described herein with regard to one or more of: WTRU 102a-d, Base Station 114a-b, eNode-B 140a-c, MME 142, SGW 144, PGW 146, the gNB(s), the AMF(s), the UPF(s), the SMF(s), the DN(s), and/or any other device(s) described herein, may be performed by one or more emulation devices. The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
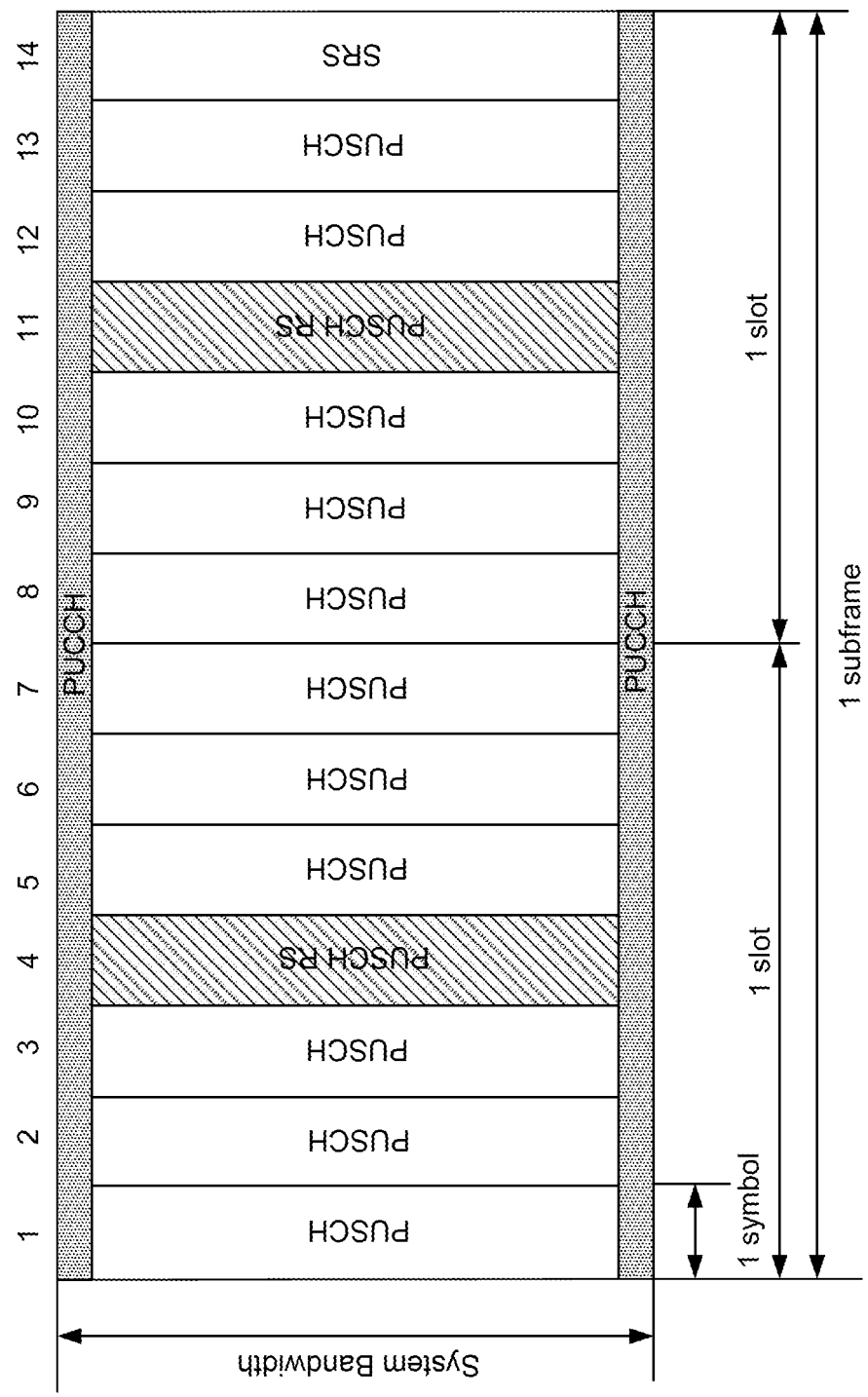
FIG. 2 shows an example uplink frame format for one subframe in accordance with an embodiment.

FIG. 2 provides an example of an LTE uplink frame format for one subframe. LTE Uplink uses a SC-FDMA scheme based DFT-s-OFDM modulation. Similar to the downlink (DL) in LTE, each subframe or transmission time interval (TTI) for the UL is partitioned into 14 symbols (including cyclic prefix (CP)) and the whole system bandwidth is shared by scheduled users for UL transmissions. The frequency domain resources (RBs) at the edges of the system bandwidth are used for transmitting a control channel (PUCCH) and its reference channel, PUCCH RS. The rest of the bandwidth is used for transmitting the data channel (PUSCH) or reference channel (PUSCH RS). For example, in FIG. 2, the $4^{th}$ and $11^{th}$ symbols are dedicated to the PUSCH RS, which may be used for channel estimation at a receiver, while the remaining symbols are used for the PUSCH.

Figure 3:
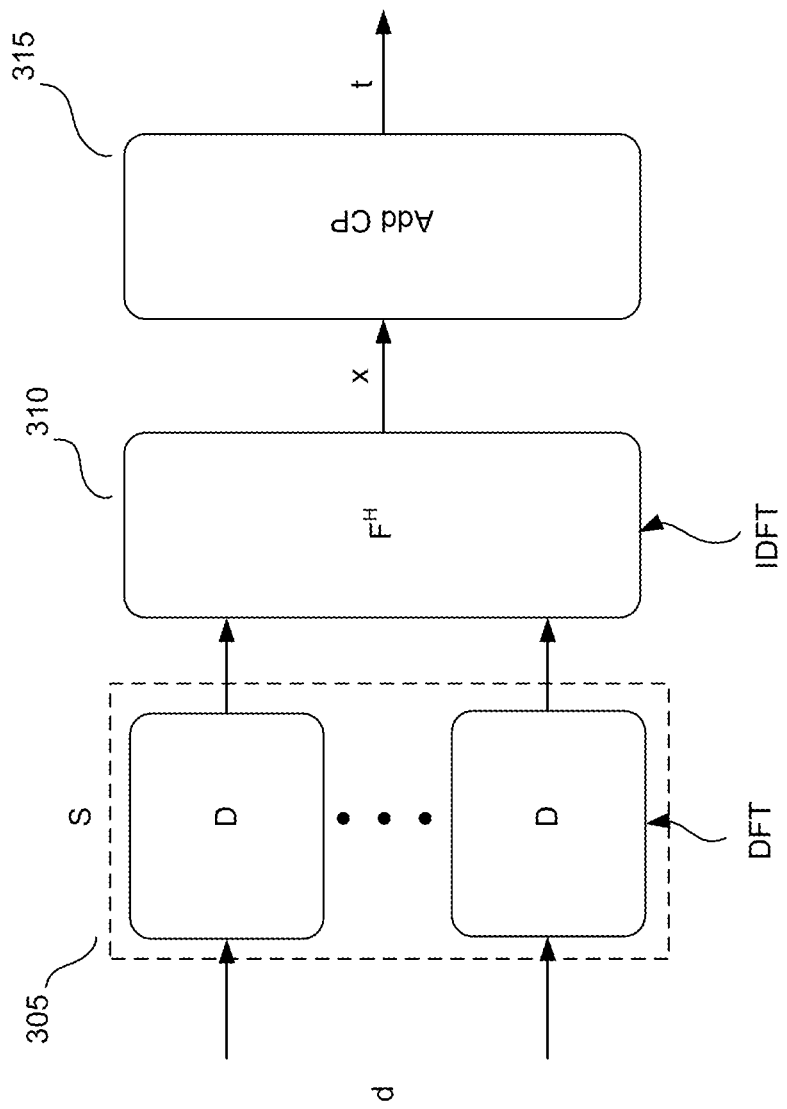
FIG. 3 shows a generic structure for the DFT-S-OFDM including multiple DFT-spread blocks.

FIG. 3 shows an example structure for performing DFT-S-OFDM wherein multiple DFT-spread blocks are equipped in the waveform structure. In conventional CP DFT-S-OFDM (sometimes referred to SC-FDMA with multiple accessing), the data symbols are first spread with a DFT block, and then mapped to the input of an IDFT block. The CP is prepended to the beginning of the symbol in order to avoid inter-symbol interference (ISI) and allow one-tap frequency domain equalization (FDE) at the receiver.

The DFT-S-OFDM is an example of a precoded OFDM scheme, where the precoding with DFT aims to reduce the PAPR. t DFT-S-OFDM is also an example of a scheme which upsamples the data symbols by a factor equal to the ratio of the IDFT and DFT block sizes, and applies a circular pulse shaping with a Dirichlet sinc function before the CP extension. A benefit of DFT-S-OFDM is that it exhibits lower PAPR than the plain CP-OFDM symbols.

In FIG. 3 DFT blocks 305 are used to spread incoming data d. Generally, it is desirable to have on DFT block per user in order minimize or reduce PARP. The spread data is then mapped to subcarriers and sent to the IDFT block at 310. Next a cyclic prefix (CP) is added to the output of the IDFT block 310, at 315.

After a set of resources (e.g. resource blocks) is allocated to a WTRU, the WTRU may choose, or be signaled, to use some resources elements within the allocated set of resources for sending reference signals in a subframe. For example, each user may use a few subcarriers within an OFDM/DFT-S-OFDM symbol for RSs and the rest of the subcarriers may be used to transmit DFT spread data symbols. The number of resource elements and times may be specific to each user so that different users may use different numbers of resource elements at different times to transmit their RSs.

Figure 4:
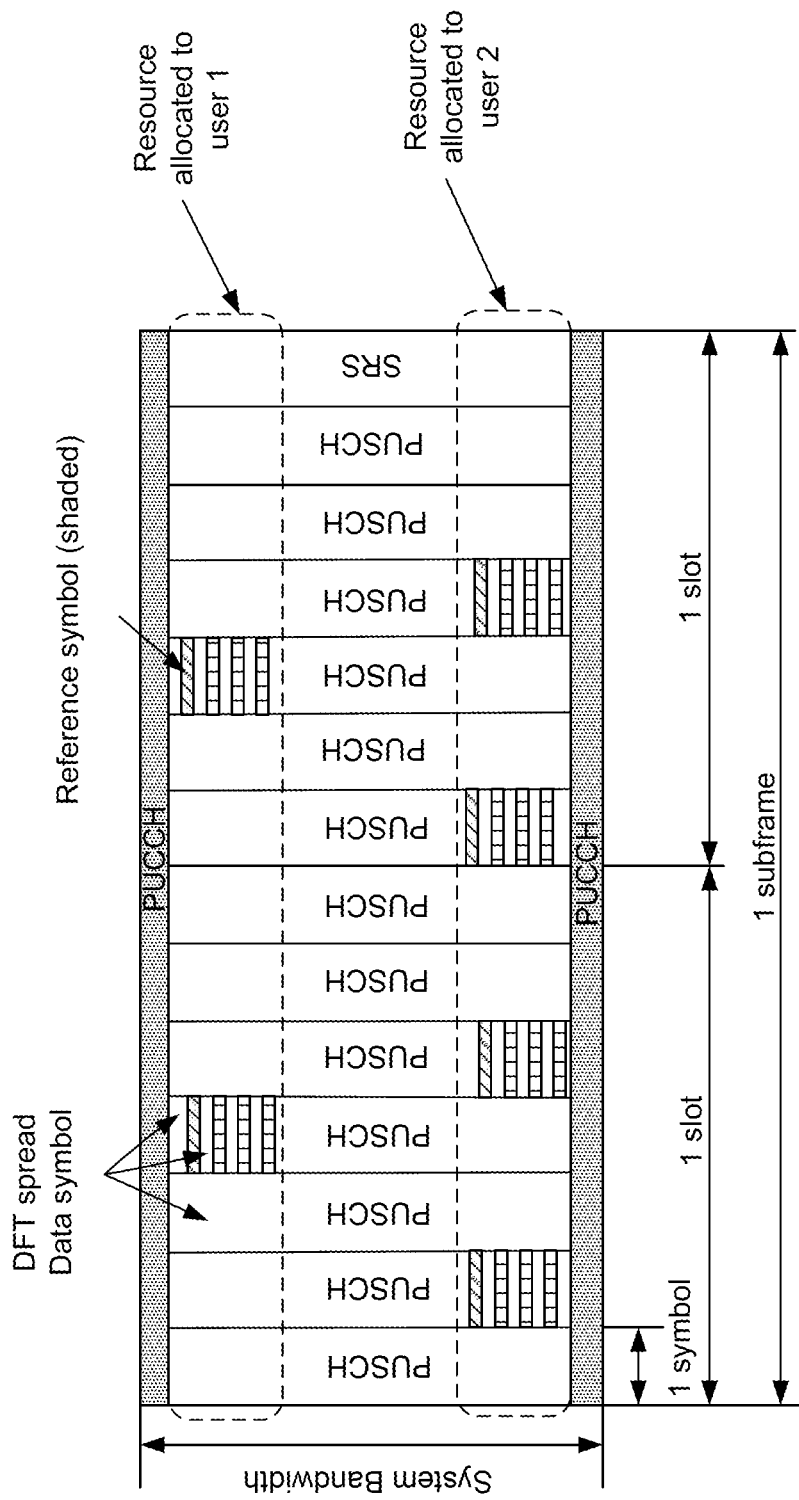
FIG. 4 shows an example of resource allocation of reference signals for two users.

In the embodiment shown in FIG. 4, two users are allocated for uplink transmission, and each user is granted a portion of the system bandwidth. The reference signals (shaded elements) are used in different patterns on different symbols between these two users. The channel condition from the first user (user 1) to the eNB may be well enough so that a few reference symbols are needed to achieve reliable channel estimation. While for user 2, the channel may vary fast or be noisy so that more reference symbols are desired to achieve more reliable channel estimation. To achieve dynamic allocation of the reference signal for DFT-s-OFDM, a special DFT-S-OFDM symbol may be used.

Figure 5:
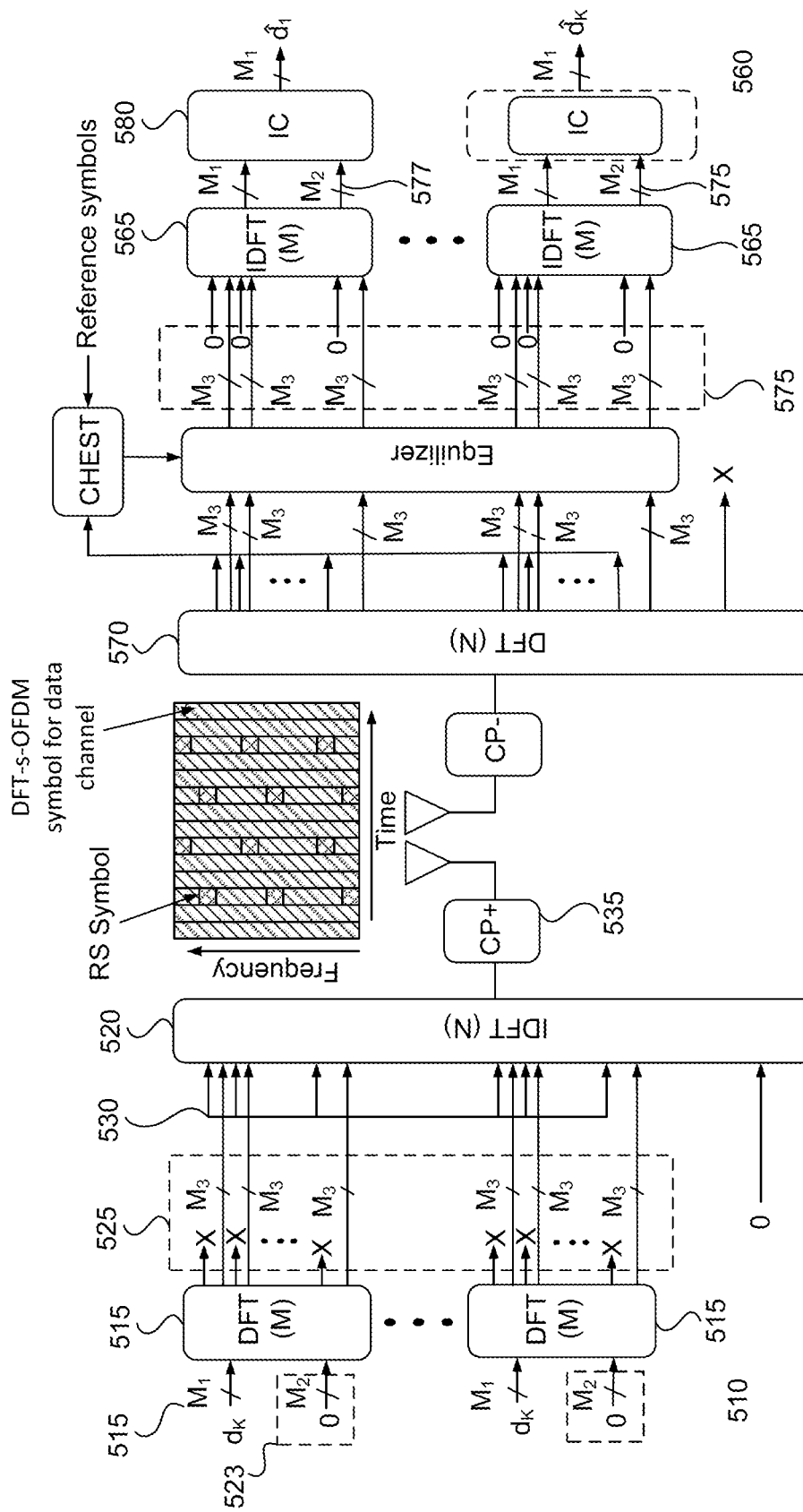
FIG. 5 shows an example of Transmitter and Receiver structures for dynamic RS insertion.

FIG. 5 shows an example transmitter 510 and receiver 560 structures that are capable of transmitting and receiving the proposed special DFT-S-OFDM symbol. The transmitter 510 (for example, a UE) may have K DFT blocks, each with size $M_1$ 518. $KM_2$ reference symbols (or pilots) need to be transmitted in the frequency domain, i.e., at the input of IDFT operation 520. To achieve this, the $M_2$ input of DFT block 523 may be set to zeroes to enable interference cancellation and the $M_1$ input 518 may be a modulated data symbol, where $M_1+M_2=M$. The locations of the zero symbols and the data symbols may be randomized and maybe different than those shown in this figure. The location of the zero samples may be chosen such that the receiver observes at least $M_3+1$ samples. At the output of each DFT block, every other $M_3$ samples may be discarded and replaced by the reference symbols 530, where $M_3=M_1/M_2$. This may be done by puncturing the interleaved outputs. For example, one or more outputs of the DFT block 523 may be punctured and each punctured output may be replaced with an RS symbol. The punctured outputs may be chosen such that they have an interleaved pattern, (e.g. every $n^{th}$ output is selected (n=M3)).

After replacing those samples with RS symbols, the new vector is fed to the input of IDFT block 520. For example, when M=8 and $M_2$=2 reference symbols $\{r_1, r_2\}$ are needed for 8 subcarriers. Then, the input of the DFT block may be $\{d_1, d_2, \ldots, d_6, 0, 0\}$ (in this case $M_1$=6). When $\{x_1, x_2, \ldots, x_8\}$ is the output of DFT, after discarding every other $$M_3 = \frac{8}{2} = 4 \; DFT$$

outputs and replacing them by $\{r_1, r_2\}$, one gets $\{r_1, x_2, x_3, x_4, r_2, x_6, x_7, x_8\}$, which will be fed to IDFT block to generate time domain signals. Note that the reference symbols may also be inserted with an offset, e.g., $\{x_1, x_3, x_4, x_5, r_2, x_7, x_8\}$ when S=1. Finally, a CP 535 is appended to the output of the IDFT block 520.

At the receiver side 560, up to the IDFT operations 564, the signal processing is similar to the receiver for DFT-S-OFDM signals. The subcarriers that carry the reference signals at the output of DFT blocks may be used for channel estimation. In addition, if the subcarriers that are discarded at the transmitter side are not replaced by reference signals (i.e., replaced by zeros), the corresponding subcarriers at the receiver DFT output 570 may be used for noise or interference power estimation.

Figure 6:
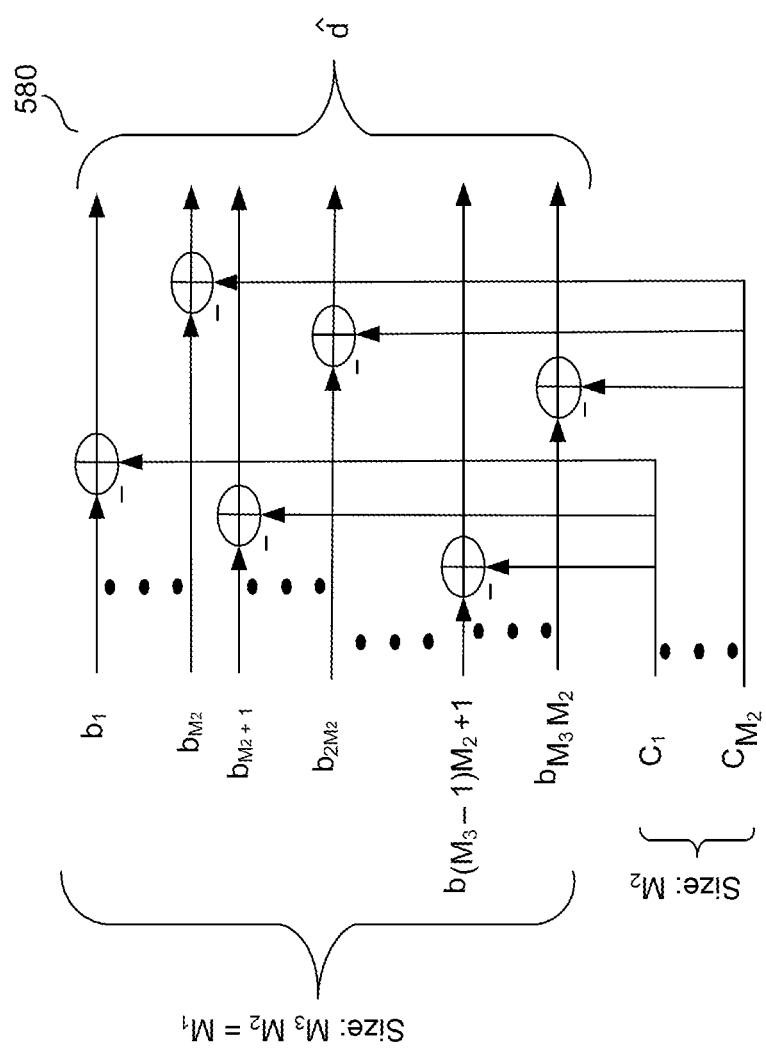
FIG. 6 shows the details of the IC block shown in FIG. 5.

Since some of the DFT block outputs are replaced by the reference symbol or pilots at the transmitter side, the output of the IDFT at the receiver side is interfered with due to "nulling" operation 575. However, the interference may be recovered from the $M_2$ outputs 577 of the IDFT blocks and may be used to remove the interference at the other output of the IDFT blocks. This process may be done in the "IC" blocks 580. As an example, the structure of the IC block 580 is given in FIG. 6 for a zero offset (i.e., S=0). The IC block 580 may also be improved with an iterative receiver architecture.

In another exemplary embodiment, the reference symbols $r_{ij}$ shown in FIG. 5 may also be replaced by data symbols if some of the data symbols need to be transmitted in frequency domain. Therefore, the system architecture shown in FIG. 5 allows transmitting DFT-S-OFDM and OFDM signals simultaneously.

In another embodiment, consider a single-user scenario consisting of a transmitter and a receiver communicating over a wireless channel. Data symbols to be transmitted within one DFT-s-OFDM symbol may be the elements of vector $d \in \mathbb{C}^{N_d \times 1}$, where $N_d$ is the number of data symbols. In basic DFT-s-OFDM, first, data symbols are mapped to the input of a DFT matrix denoted by $D \in \mathbb{C}^{M \times M}$ via a mapping matrix $M_t \in \mathbb{C}^{M \times M}$, where M is the DFT size and $M=N_d$ as a special case. The output of the DFT is then mapped to a set of subcarriers in the frequency domain via another mapping matrix $M_f \in \mathbb{C}^{N \times M}$. Without loss of generality, the mapping matrix $M_f$ can be constructed such that it allocates M localized or interleaved subcarriers to achieve low PAPR. Finally, the output of the matrix $M_f$ is converted to time domain via $F^H$ as:

$$x = F^H M_f D M_t d, \qquad \text{Equation (1)}$$

where $F^H \in \mathbb{C}^{N \times N}$ is the inverse DFT (IDFT) matrix and N is the number of subcarriers.

Let the channel impulse response (CIR) between the transmitter and the receiver be a vector $h=[h_0 \; h_1 \; \ldots \; h_L]$, where $\mathcal{L}+1$ is the number of taps. Assuming that the size of the cyclic prefix is larger than $\mathcal{L}$, the received signal vector y can be expressed as:

$$y = Hx + n, \qquad \text{Equation (2)}$$

where $H \in \mathbb{C}^{N \times N}$ is the circular convolution matrix that models the interaction between the transmitted signal x and the channel h, and $n \in \mathbb{C}^{N \times N} \sim \mathcal{CN}(0_{N \times 1}, \sigma^2 I_N)$ is the additive white Gaussian noise (AWGN) with variance $\sigma^2$.

At the receiver, the operations applied at the transmitter are reversed by considering the impact of the multipath channel. The receiver operation can be expressed as:

$$\hat{d} = M_t^H D^H Q M_f^H F y, \qquad \text{Equation (3)}$$

here $\hat{d} \in \mathbb{C}^{N_d \times 1}$ is the estimated data symbol vector and $Q \in \mathbb{C}^{M \times M}$ is the equalizer, which removes the impact of the multipath channel. The equalizer Q is a diagonal matrix and may be derived by using the minimum mean square error (MMSE) criterion.

As can be seen in Equation (1), data symbols are spread across frequency by the matrix D in DFT-s-OFDM. Therefore, legacy DFT-s-OFDM does not leave any room for frequency domain RSs in M-dimensional subspace spanned by M columns of $F^H$. To allow the receiver to estimate the channel, the RSs may be transmitted with another DFT-s-OFDM symbol by using a fixed sequence (e.g., Zadoff-Chu sequences, as in LTE). However, adopting two separate DFT-s-OFDM symbols reduces the data rate substantially as the number of estimated coefficients needed to extrapolate channel frequency response may be significantly less than M.

In order to insert RSs at some frequency tones, one may follow different strategies including the following. One option is to puncture the information in the frequency domain by relying on the redundancy introduced by channel coding. However, it may not yield recoverable DFT-s-OFDM signals at the receiver as the number of unknowns, i.e., $N_d(=M)$, is greater than the number of observations, i.e., $M-N_p$, within one symbol after the puncturing, i.e., $N_d=M>M-N_p$, where $N_p>0$ is the number of punctured samples in frequency.

In another option, the number of data symbols may be reduced as $N_d<M$ and the size of D may be changed from M to $N_d$ to accommodate the reference symbols within M-dimensional subspace. However, reference symbols are generally not needed for all of the symbols in a frame or subframe. Thus, this option causes both transmitter and receiver to need to employ a DFT block with variable sizes, likely not suitable with radix-2 FFT implementation.

In the third option, the number of data symbols $N_d \leq M$ is reduced while keeping the size of DFT as M so that the number of unknowns is less than or equal to the number of observations after the puncturing, i.e., $N_d \leq M-N_p$. This option does not increase the transmitter complexity. However, the puncturing implicitly causes interference to the data symbols and it is not straightforward to recover the data symbols with a low-complexity receiver. In the following description, this challenge is overcome and it is shown that the data symbols can be recovered with a low-complexity receiver by employing the certain puncturing pattern and inserting zeros to certain locations before a DFT-spreading block at the transmitter.

Figure 7:
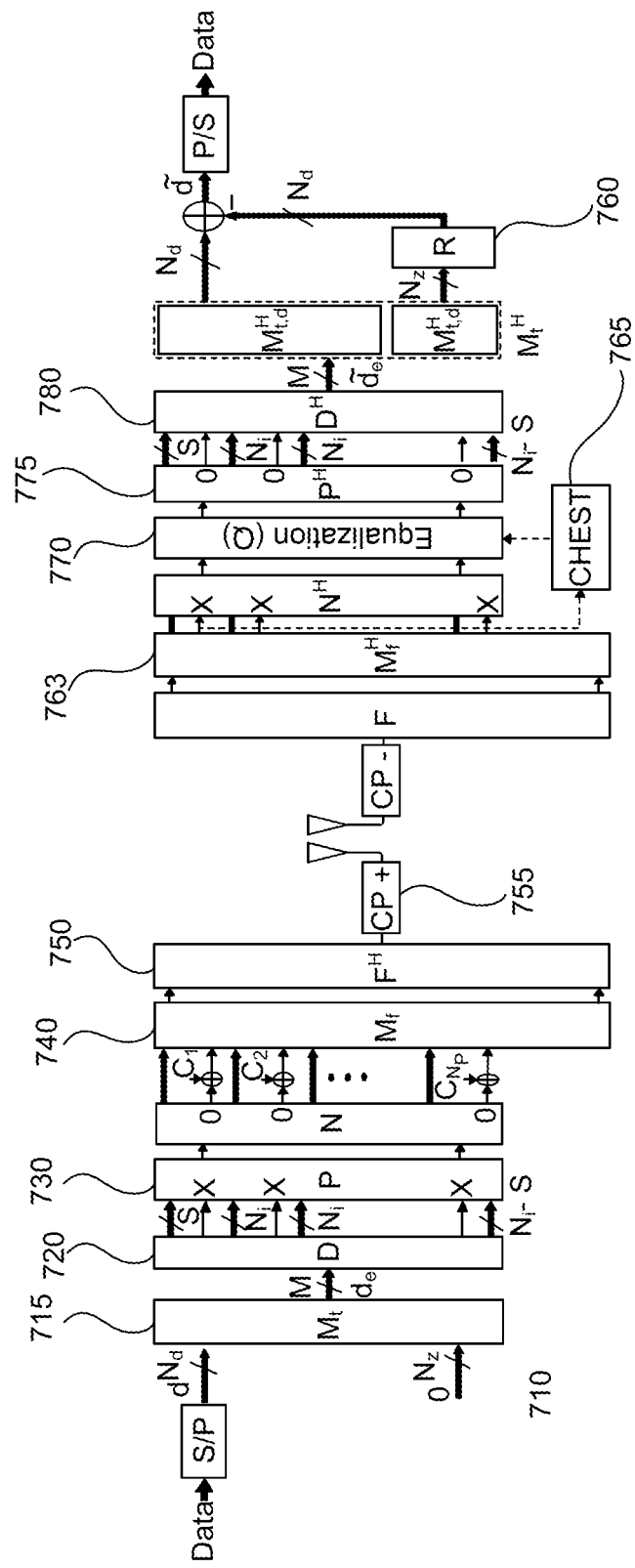
FIG. 7 shows a different numerology within a subframe with a single carrier waveform.

FIG. 7 shows an example of a transmitter 710 and receiver 760 for generalized DFT-S-OFDM with frequency domain reference symbols is described. In this scheme, $N_z=M-N_d \geq N_p$ null symbols are introduced 715 before DFT spreading 720 so that the number of observations is greater than or equal to the number of unknowns after puncturing $N_p$ samples in frequency. The puncturing operation 730 may be expressed with the matrix $P \in \mathbb{R}^{(M-N_p) \times M}$ considering that P punctures one symbol every other $N_I$ symbols at the output of the DFT 720 with an offset. Due to its periodic structure, the matrix P can be expressed as:

$$P = I_{N_p} \otimes \begin{bmatrix} I_S & 0_{N_i \times 1} & 0_{S \times N_i - S} \\ 0_{N_i - S \times S} & 0_{N_i \times 1} & I_{N_i - S} \end{bmatrix}, \qquad \text{Equation (4)}$$

where $$N_p = \frac{M}{N_i + 1}$$

and $N_i+1$ is integer multiple of M. Without loss of generality, the punctured vector is mapped to another vector in M-dimensional space by inserting $N_p$ zeros via a nulling matrix $N \in \mathbb{C}^{M \times M - N_p}$ to accommodate frequency domain reference symbols denoted by $c_l$ where $l=1, 2, \ldots, N_p$ (940). The reference symbols can be distributed uniformly in frequency by the IDFT block (950) to improve channel estimation performance at the receiver 950). In this case, one may choose the matrix N as:

$$N = I_{N_p} \otimes [I_{N_i} 0_{N_i \times 1}]^T. \qquad \text{Equation (5)}$$

The overall transmit operation can finally be expressed as:

$$x = \alpha F^H M_f NPDM_t \begin{bmatrix} d \\ 0_{N_z \times 1} \end{bmatrix}, \qquad \text{Equation (6)}$$

where $$\alpha = \sqrt{\frac{N_d}{N_d - N_p}}$$

is scalar which scales the energy of x to be $N_d$ after the puncturing. A CP may be affixed prior to transmission of the symbols (755).

As discussed above, the puncturing operation distorts the output of DFT-spreading implicitly and causes significant interference on data symbols. The interference on the data and null symbols can be expressed as:

$$r = D^H P^H P D d_e - d_e, \qquad \text{Equation (7)}$$

where $d_e \in \mathbb{C}^{M \times 1}$ is the mapped data symbols and can be obtained as $d_e = M_t [d^H \, 0_{N_z \times 1}^H]^H$ and $r \in \mathbb{C}^{M \times 1}$ is the interference vector. The interference vector is not arbitrary as every other $N_I$ output of the DFT-spread block is nulled. By using the lemma given below, one can obtain the structure of the interference vector r.

Lemma 1 given below has two important results. First, by using Lemma 1, one can deduce that the kth element of the vector r is $$r_k = p_k e^{2\pi k \frac{S}{M}} \text{ and } p_k = p_{k+N_p}.$$

Secondly, it shows that the degrees of freedom of the interference vector r is $N_p$ as $p_k = p_{k+N_p}$. Hence, one can regenerate the vector r by observing only $N_p$ elements of r that correspond to the samples within one period of $p_k$ and inferring the rest of the vector r by using the relation of $p_k = p_{k+N_p}$. In other words, $M_t$ should be chosen such that the location of the null symbols captures the samples at least for one period of $p_k$. Hence, Lemma 1 enlightens where to insert null symbols to allow the receiver to recover the data symbol without any distortion. For example, let M=8, S=0, and $N_p=2$, and assume that one chooses the input of the DFT block to be $(d_1, d_2, \ldots, d_6, 0, 0)$ (i.e., $N_z=2$, $M_t=I_8$). Let $(x_1, x_2, \ldots, x_8)$ be the output of DFT. After discarding every $N_I=4$ DFT outputs and replacing them by $(c_1, c_2)$, one gets $\{c_1, x_2, x_3, x_4, c_2, x_6, x_7, x_8\}$, which will be fed to IDFT block 750 to generate a time domain signal. At the receiver side, there are only 6 samples related to data symbols at the output of IDFT block. By neglecting the impact of noise for the sake of clarity and by using Lemma 1, one can show that the IDFT of the equalized vector $d_e$ is $(d_1+p_1, d_2+p_2, d_3+$ $p_1, \ldots, d_5+p_1, d_6+p_2, p_1, p_2$) where the last two samples reveal the interference vector r as $p_k = p_{k+2}$. On the other hand, the selection of the data vector as $(0, d_1, 0, d_2, \ldots, d_6)$ does not allow the receiver to regenerate r as first and third samples carry the same interference sample after the puncturing.

At the receiver side 760, up to the frequency domain de-mapping operation, i.e., $M_f^H$, 763 the signal processing is the same for both the legacy DFT-s-OFDM and the proposed scheme described herein. As opposed to the legacy DFT-s-OFDM, the subcarriers that carry the reference signals at the output of DFT can be used for channel estimation (CHEST) 765 with the proposed scheme. By using the estimated channel, the data bearing subcarriers are first equalized 770 via $Q \in \mathbb{C}^{M-N_p \times M-N_p}$ and the symbols at the output of equalizer are then mapped to the input of IDFT via $P^H$ 775. The output of IDFT $D^H$ 780 can be expressed as:

$$\tilde{d}_e = \frac{1}{\alpha} D^H P^H Q N^H M_f^H F y, \quad \text{Equation (8)}$$

where $\tilde{d}_e \in \mathbb{C}^{M \times 1}$ is the received vector which includes the impacts of noise, equalization, and puncturing. Considering the structure of the interference due to the puncturing, a simple way to recover the data symbols is:

$$\tilde{d} = M_{t,d}^H \tilde{d}_e - R M_{t,r}^H \tilde{d}_e \quad \text{Equation (9)}$$

where $M_{t,d} \in \mathbb{C}^{M \times N_d}$ and $M_{t,r} \in \mathbb{C}^{M \times N_z}$ are the submatrices of $M_t$ as $M_t = [M_{t,d} \ M_{t,r}]$, and $R \in \mathbb{C}^{N_d \times N_z}$ is the reconstruction matrix that calculates the distortion due to the puncturing based on the relation of $$r_k = p_k e^{2\pi k \frac{S}{M}} \text{ and } p_k = p_{k+N_p}$$

dictated by Lemma 1. As a special case, when $S=0$ and $M_t = I_M$, R becomes a repetition matrix given by $$R = 1_{N_p \times 1} \otimes I_{N_z}, \quad \text{Equation (10)}$$

which simplifies the receiver structure substantially. For example, if $d_e$ is $(d_1+p_1, d_2+p_2, d_3+p_1, \ldots, d_5+p_1, d_6+p_2, p_1, p_2)$, R replicates the last two samples by $N_r = 3$ times and one can recover the data symbols by subtracting the replicated vector from the rest of the samples of $\tilde{d}_e$ as expressed in Equation (9).

Although the method discussed in above enables a low-complexity receiver, it enhances the noise by 3 dB as two noisy observations are added by Equation (9). One effective way of mitigating the noise enhancement is to use an iterative receiver which aims to remove the noise on the second part of Equation (9), i.e., distortion due to the puncturing. To this end, for the ith iteration, the data symbols are estimated by:

$$\tilde{d}^{(i)} = M_{t,d}^H \tilde{d}_e - R M_{t,r}^H \tilde{d}_e^{(i-1)}, \quad \text{Equation (11)}$$

where $\tilde{d}_e^{(0)} = \tilde{d}_e$. The estimated data symbols $\tilde{d}^{(i)}$ are then mapped to closest symbol in the constellation by a non-linear function $f(\cdot)$, i.e., demodulation, and $\tilde{d}_e^{(i+1)}$ is prepared for the next iteration as:

$$\tilde{d}_e^{(i+1)} = D^H P^H P D M_t \begin{bmatrix} f(\tilde{d}^{(i)}) \\ 0_{N_I \times 1} \end{bmatrix}. \quad \text{Equation (12)}$$

Since $\tilde{d}_e^{(i+1)}$ is generated after the decision is made by $f(\tilde{d}^{(i)})$, it removes the noise from the second part of Equation (11) effectively and leads to a better estimate of $\tilde{d}$ for the (i+1)th iteration.

It is important to emphasize that the proposed schemes described herein introduce some conditions on the puncturing pattern, the number of reference signals $N_p$, the number of null symbols $N_z$, and the pattern of the null symbols. First, the receiver structures discussed above exploit the fact that every $N_i$ other output of the DFT with an offset S are punctured. Second, $N_z \geq N_p$ must hold and the pattern of $N_z$ null symbols at input of DFT-spread block should capture at least one period of distortion due to the puncturing to yield a recoverable a DFT-s-OFDM symbol. One simple way of doing is to consider $N_z$ adjacent null symbols.

There is also room to increase the performance of the receiver. For example, one simple way of improve the receiver performance is to increase the number of null symbols more than the number of punctured symbols, i.e., $N_z > N_p$. In this case, the receiver can combine the samples to calculate a more reliable interference vector at the expense of less spectral efficiency. The receiver structures described above may also be improved by including the channel coding decoder along with demodulation on the feedback branch.

Without loss of generality, the schemes described herein can be expended to multiple DFT blocks. In addition, if the subcarriers that are discarded at the transmitter side are not replaced by RSs (i.e., replaced by zeros), the corresponding subcarriers at the receiver DFT output can also be used for noise or interference power estimation.

As mentioned above, lemma 1 will now be described. Lemma 1 (Periodic Interference): Let $(X_n)$ be a sequence of size $M \in \mathbb{Z}$ for $n = 0, 1, \ldots, M-1$ and let $(Y_n)$ be another sequence obtained by zeroing every other $N_i$, $N_i \in \mathbb{N}$ elements of $(X_n)$ with an offset of S, $S \leq N_i$, $S \in \mathbb{N}_0$. Then, it is possible to decompose the IDFT of $Y_n$ as:

$$y_k = x_k + r_k, \text{ for } n = 0, M-1, \quad \text{Equation (13)}$$

where $(y_k)$ is the IDFT of $(Y_n)$, $(x_k)$ is the IDFT of $(X_n)$, and $(r_k)$ is a sequence of size M given by $$r_k = p_k e^{2\pi k \frac{S}{M}},$$

for $k = 0, \ldots, M-1$ where $(p_k)$ is period sequence with the period of $$\frac{M}{N_i + 1}.$$

The elements of the sequence $(Y_n)$ can be expressed by using an auxiliary sequence $(R_n)$ as:

$$Y_n = X_n + R_n, \quad \text{Equation (14)}$$

where:

$$R_n \triangleq \begin{cases} -X_n & \frac{n-S}{N_i+1} \in \mathbb{Z} \\ 0 & \text{otherwise} \end{cases} \quad \text{Equation (15)}$$

Since IDFT operation is linear, the IDFT of $(Y_n)$ can be expressed as $(y_k) = (x_k) + (r_k)$, where $(r_k)$ is the IDFT of $(R_n)$. The elements of $(r_k)$ can be calculated as:

Equation (16)

$$r_k = \sum_{n=0}^{M-1} R_n e^{2\pi k \frac{n}{M}} \overset{(a)}{=}$$

$$\sum_{m=0}^{\frac{M}{N_i+1}-1} -X_{(N_i+1)m+S} e^{2\pi k \frac{(N_i+1)m+S}{M}} \overset{(b)}{=} \underbrace{s_{k \bmod \left(\frac{M}{N_i+1}\right)} e^{2\pi k \frac{S}{M}}}_{p_k}$$

where $(s_m)$ is the IDFT of $(-X_{(N_i+1)m+S})$ for $$m = 0, \ldots, \frac{M}{N_i+1} - 1.$$

In Equation 16, (a) is true because $r_n$ is zero when $$\frac{n-s}{N_i+1}$$

is not an integer and (b) is true due to the periodicity of the exponential function $$e^{-2\pi k \frac{(N_i+1)m}{M}},$$

which results in $$p_k = p_{k + \frac{M}{N_i+1}}.$$

In certain scenarios, when a single carrier waveform such as DFT-s-OFDM is used, all of the subcarriers within the allocated bandwidth may be used to transmit reference signal (pilot) symbols. In such a transmission mode, it may be possible to dynamically change the number of the waveform symbols (for example DFT-s-OFDM symbols) that carry reference signals. As an example, in LTE uplink data transmission, one subframe consists of 14 DFT-s-OFDM symbols and two of these symbols are used to transmit pilots. If a WTRU needs better channel estimation, for example, due to mobility, it may be possible to increase the number of symbols for RS transmission from two to three or more.

Changing the number of pilot symbols would change the amount of resources allocated for data transmission. As a result, the transport block size and/or coding rate may need to be modified. In one solution, the number and location of pilot symbols may be configured by a central controller such as the eNB, and/or signaled dynamically in the control channel for each transmission. For each of the possible number of pilot symbols, corresponding values for the transport block size may be defined.

Figure 8:
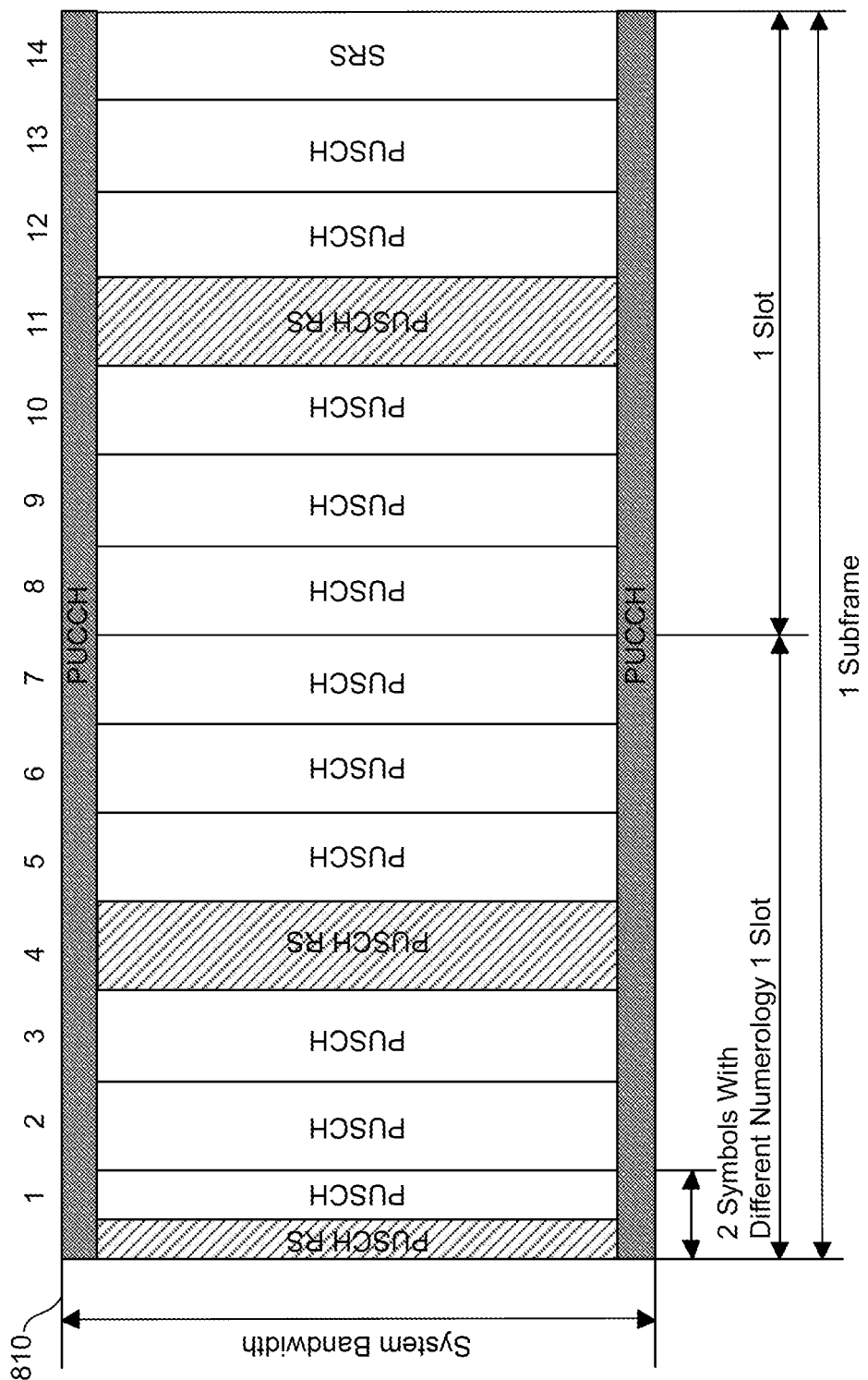
FIG. 8 shows a different numerology within a subframe with an OFDM waveform.

FIG. 8 shows an example subframe in which, some of the symbols transmitted within a specific time interval are generated by using different waveform numerology than the remaining symbols. In FIG. 8, the time interval used for the first PUSCH symbol 810 is used to transmit two DFT-s-OFDM symbols, where each DFT-s-OFDM symbol has half the symbol duration of the remaining symbols. One of the two new DFT-s-OFDM symbols is used for reference signal transmission while the other symbol is used for data transmission.

When the waveform is not a single carrier waveform, for example, when it is OFDM, it may be possible to dynamically or semi-statically configure certain subcarriers of certain OFDM symbols as data or pilot subcarriers. The subcarriers that were used for data transmission may be configured to carry reference symbols, or subcarriers that were used for pilot transmission may be configured to carry data. It may be possible to transmit a number of OFDM symbols within a specific time interval where some of the OFDM symbols may be generated by using different waveforms and numerologies than the remaining OFDM symbols.

Figure 9:
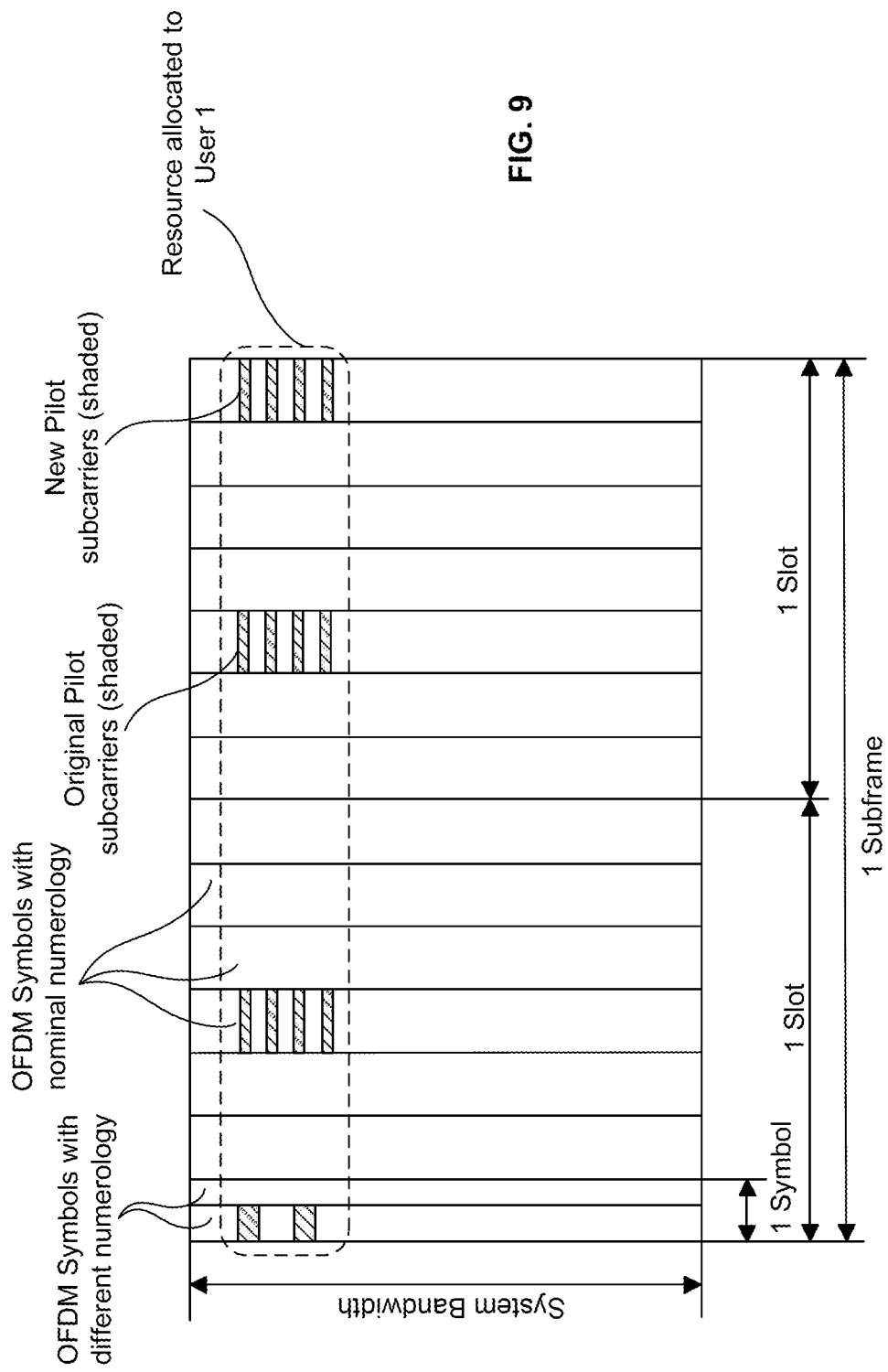
FIG. 9 shows a transmitter and receiver block diagram for DFT-S-OFDM with generalized frequency domain reference symbols.

In FIG. 9, an example is provided where some of the subcarriers in the last OFDM symbol of the subframe are configured to transmit reference symbols, in addition to the subcarriers that were originally configured to transmit reference symbols. In addition, the first two OFDM symbols have half the duration of the remaining OFDM symbols and some subcarriers of the first OFDM symbol are also configured for reference symbol transmission. It should be noted that due to the different waveform numerologies, the first two OFDM symbols may have larger subcarrier spacing than the remaining OFDM symbols. Also, although a cyclic prefix (CP) is not shown in the figure, a CP may precede each OFDM symbol. These techniques may apply to other multicarrier waveforms such as Windowed-OFDM, Filtered OFDM, Filterbank Multicarrier, and the like.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
receiving, by a wireless transmit/receive unit (WTRU), dynamic scheduling information from a base station, the dynamic scheduling information indicates discrete Fourier transform spread—orthogonal frequency division multiplex (DFTS-OFDM) symbol times and a number of DFTS-OFDM symbols to use for reference signal symbols for a first physical uplink shared channel (PUSCH) transmission;
transmitting, by the WTRU, the first PUSCH transmission using DFTS-OFDM having reference signals at the indicated DFTS-OFDM symbol times and the indicated number of DFTS-OFDM symbols to use for reference signal symbols;
receiving, by the WTRU, second dynamic scheduling information; and
transmitting, by the WTRU, a second PUSCH transmission using DFTS-OFDM having reference signal symbols at symbol times and a number of DFTS-OFDM symbols indicated by the second dynamic scheduling information, wherein symbol times or numbers of symbols to use for reference signals differ between the dynamic scheduling information and the second dynamic scheduling information.

2. The method of claim 1 wherein the base station is a gNodeB and the WTRU is a new radio (NR) user equipment (UE).

3. The method of claim 1 wherein in response to receiving, by the WTRU, second dynamic scheduling information the second PUSCH transmission includes nulled subcarriers in a symbol used to transmit a reference signal.

4. The method of claim 1 wherein symbol times or numbers of symbols to use for reference signals differ between the dynamic scheduling information and the second dynamic scheduling information based on channel conditions.

5. A wireless transmit receive unit (WTRU) comprising:
a receiver configured to receive dynamic scheduling information from a base station, the dynamic scheduling information indicates discrete Fourier transform spread—orthogonal frequency division multiplex (DFTS-OFDM) symbol times and a number of DFTS-OFDM symbols to use for reference signal symbols for a first physical uplink shared channel (PUSCH) transmission
a transmitter configured to transmit the first PUSCH transmission using DFTS-OFDM having reference signals at the indicated DFTS- OFDM symbol times and the indicated number of DFTS-OFDM symbols to use for reference signal symbols;
the receiver is further configured to receive a second dynamic scheduling information, and
the transmitter is further configured to transmit a second PUSCH transmission using DFTS-OFDM having reference symbols at symbol times and a number of DFTS-OFDM symbols indicated by the second dynamic scheduling information, wherein symbol times or numbers of symbols to use for reference signals differ between the dynamic scheduling information and the second dynamic scheduling information.

6. The WTRU of claim 5, wherein the base station is a gNodeB and the WTRY is a new radio (NR) user equipment.

7. The WTRU of claim 5, wherein in response to the second dynamic scheduling information, the transmitter is configured to transmit the second PUSCH transmission having nulled subcarriers in a symbol used to transmit a reference signal.

8. The WTRU of claim 5, wherein symbol times or numbers of symbols to use for reference signals differ between the dynamic scheduling information and the second dynamic scheduling information based on channel conditions.

9. A wireless transmit receive unit (WTRU) comprising:
a receiver configured to receive dynamic scheduling information from a base station, the dynamic scheduling information indicates discrete Fourier transform spread—orthogonal frequency division multiplex (DFTS-OFDM) symbol times and a number of DFTS-OFDM symbols to use for reference signal symbols for a physical uplink shared channel (PUSCH) transmission, the receiver is further configured to receive a second dynamic scheduling information; and
a transmitter configured to transmit a first signal on a the PUSCH using DFTS-OFDM, the first signal having reference signals at the indicated symbol times and number of DFTS-OFDM symbols, and the transmitter is further configured to transmit, a second signal on the PUSCH using DFTS-OFDM having reference symbols at symbol times and number of DFTS-OFDM symbols indicated by the second dynamic scheduling information, wherein symbol times or numbers of symbols to use for reference signals differ between the dynamic scheduling information and the second dynamic scheduling information.

10. The WTRU of claim 9, wherein the base station is a gNodeB and the WTRU is a new radio (NR) user equipment (UE).

11. The WTRU of claim 9, wherein numbers of DFTS-OFDM symbols to use for reference signal symbols increases as the channel conditions become poorer.

* * * * *